United States Patent [19]
Reeves

[11] 3,801,732
[45] Apr. 2, 1974

[54] METHOD AND APPARATUS FOR SCRAMBLED TELEVISION

[76] Inventor: James J. Reeves, 10,622 Artcraft Ave., Garden Grove, Calif. 92640

[22] Filed: Nov. 22, 1971

[21] Appl. No.: 200,784

[52] U.S. Cl. .............. 178/5.1, 178/DIG. 13, 325/34, 235/61.11 E
[51] Int. Cl. .............. H04n 1/44
[58] Field of Search ........ 178/5.1, DIG. 13; 325/34; 235/61.11 E

[56] References Cited

UNITED STATES PATENTS

| | | | |
|---|---|---|---|
| 3,069,492 | 12/1962 | D'Agostini | 178/5.1 |
| 3,411,089 | 11/1968 | Gicca | 325/33 |
| 2,972,009 | 2/1961 | Roschke | 178/5.1 |
| 3,081,377 | 3/1963 | Watters | 178/5.1 |
| 3,612,888 | 10/1971 | Boucher | 235/61.11 E |
| 3,440,338 | 4/1969 | Walker | 178/5.1 |
| 3,527,877 | 9/1970 | Walker | 178/5.1 |

*Primary Examiner*—Maynard R. Wilbur
*Assistant Examiner*—S. C. Buczinski
*Attorney, Agent, or Firm*—Harry R. Lubcke

[57] ABSTRACT

A method of rendering television transmissions unintelligible to unauthorized television receivers in which both video and synchronizing information, typically, is rendered alternately useable and unuseable to unauthorized receivers in a secret predetermined manner prior to transmission. An encoded signal derived from a punched card or equivalent and a digital count-down arrangement is added during the blanking time interval of the television signal, which is then transmitted over the air or through other equivalent facilities. The encoding signal is related to, but to enhance the secrecy does not directly indicate the intervals of unuseable information. At the receiver a decoder unit with a similar punched card or equivalent and a digital count-down arrangement alters the unuseable intervals of information to make all information useable. An ordinary television receiver may then be used for reproducing the video information, as by remodulating the useable information onto a carrier for an unused television channel.

11 Claims, 14 Drawing Figures

METHOD AND APPARATUS FOR SCRAMBLED TELEVISION

BACKGROUND OF THE INVENTION

This invention pertains to secret telegraphy (television) systems.

The prior art has proposed methods and apparatus for coded television in which the video information only has been frequently reversed in polarity. It is urged that when such information is exhibited on an unauthorized television receiver the screen goes more or less blank. The successive positive and negative image sequences tend to cancel out the picture, or at least to cause excessive flicker.

Other schemes involve image jitter at an uncoded television receiver because the timing is altered between synchronizing and video information. In others, the position of the whole raster is moved at a blurring rate. In others, a masking noise signal is added to a video polarity reversing process. In still others, falsely timed synchronizing pulses are transmitted with the over-the-air television transmissions, with true synchronization available over a telephone line at a price.

A constraint has recently been placed upon the art in that for any coded television system for public use the incoming signal shall be processed to be useable prior to entering an ordinary television receiver. This normally requires remodulation of the decoded information upon the carrier of a standard television channel; one not used in the particular area of television reception.

SUMMARY OF THE INVENTION

Exemplary of an embodiment of the coding and decoding method and apparatus, both the video and synchronizing information are reversed in polarity in the modulated carrier-wave envelope according to a predetermined random periodicity. This is equivalent to transmitting with "negative polarity" of modulation, as is standard in the United States, for an interval, and then transmitting with "positive polarity" of modulation, as is one standard in Great Britain, for a succeeding interval, and then repeating the sequence, on and on, in a manner that cannot be duplicated by merely interpreting information transmitted over-the-air.

With receivers constructed to accept one type of transmission, say negative polarity transmission, the synchronizing pulses are normal and useful for one interval, but are absent for the next. Moreover, the high white portions of the television image are present within the otherwise synchronizing range of amplitude. These create false synchronizing pulses in the synchronizing circuits which are improperly timed. The synchronization of the receiver is thus very sorely disrupted. About the time a recognizable image might be reproduced because of proper synchronization the sequence of transmission polarity is changed again by the coding and overall mis-synchronization continues.

Importantly, the predetermined sequence of alternation of the polarity of transmission, or of some other secrecy processing, is provided for both the transmitter and the receiver by means of punched cards or the equivalent, and not by pulses transmitted with the video and synchronizing information. The cards may be changed from time to time in the operation of the system for secrecy and/or billing reasons. Counter, gating, encoder and burst circuitry are provided at the transmitter to also transmit a burst, signifying the start of a new sequence of counting, which card-circuit interplay determines the periods of alternation.

At the receiver, circuitry to receive and demodulate the incoming carrier-wave is provided. This connects to a duplicate of the encoder circuits, now acting as decoder circuits, so that the video and synchronizing information is returned wholly to normal. This may be used directly, but for usual applications in accordance with the requirement on the art it is remodulated upon a second carrier-wave for normal reception by an unaltered television receiver.

The periods of alternation are typically related to the scanning process. They may have a duration of a number of lines, as 100, or preferably, a number of fields, as in the range from two to 60.

In the operation of the system, a series of narrow flag pulses are generated and sequentially trigger a gating signal generator at the transmitter encoder. Simultaneously, short signal bursts are added to the video and synchronizing information that is broadcast. These trigger a similar gating signal generator at each receiver decoder unit.

As the gating signal generator units at each of these locations are sequentially triggered, gating pulses for alternating the polarity of the video and synchronizing signal are generated internally, as determined by the punched hole card and the matrix logic circuits contained within these units. Needless to say, the card at each receiver must be a duplicate of that used at the transmitter for intelligible reception to take place.

At the completion of each gate pulse encoding sequence at the encoder a wider flag burst signal is transmitted. When received and detected as wider at each decoder unit, all counters are reset to zero count in the gating signal generator circuits. This insures that each of these circuits start counting from zero at the same time, so that identical gating pulses are generated in time phase at each decoder.

Neither the narrow or the wide flag burst signals as transmitted over-the-air contain a clue as to the actual periods the video and synchronizing signals are reversed, or the transmitted information otherwise coded. This is determined by the punched hole card coding in the gating signal generator. The flag bursts service only to simultaneously trigger the encoding and decoding circuits, whatever the internal coding may be.

DESCRIPTION OF THE PREFERRED EMBODIMENTS

Figure 1:
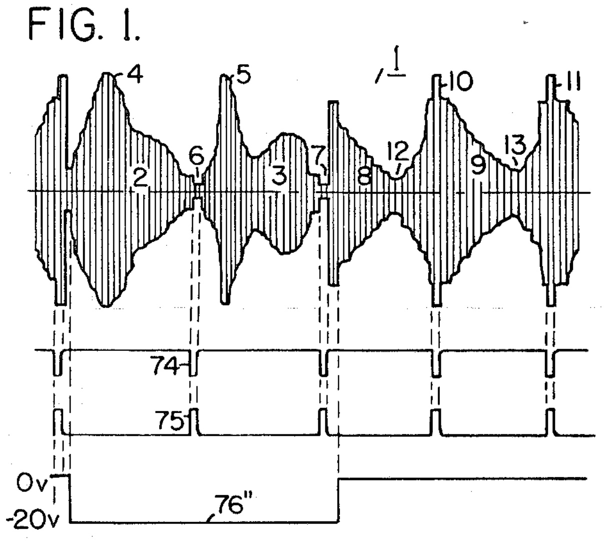
FIG. 1 shows a few fields, actually a few lines, of alternately polarized modulated carrier-wave waveform according to an example of this invention.

Waveform 1 of FIG. 1 illustrates a radio frequency carrier-wave having inversions of polarity of both video and synchronizing information according to an embodiment of the invention, as this wave is transmitted from the transmitter to a receiver through space.

The first two complete cycles (lines) 2 and 3 are of "inverted" polarity of video and synchronizing signals. That is, these are inverted with respect to the television standard of the United States. The maximum excursions of video 4 and 5, white in the image, are at maximum carrier-wave amplitude, while synchronizing pulses 6 and 7 are at minimum amplitude. It may be mentioned that this polarity is according to the original television standard in Great Britain; thus, this mode of transmission is known to be practical.

The second two complete cycles 8 and 9 are of "normal" polarity with respect to the United States standard; also known as a "negative" polarity of transmission. The maximum excursions of this waveform are occupied by synchronizing pulses 10 and 11. The maximum excursions of video, white in the image, are now carried at minimum carrier amplitude, at 12 and 13.

In FIG. 1 only two lines inverted and two lines normal polarity are shown for simplicity. In practice it is preferable to arrange a large number of lines having one polarity, say 100, with a subsequent sequence of another number, such as 50 or 150, in any random manner desired.

Even more desirable is the transmission of a number of whole fields of the image, within the range of from two to 60 or more, in a prearranged random sequence, which itself may be changed from time to time. The waveforms are the same in polarity as those shown in FIG. 1, and the appearance is the same; however, a whole field is included between each synchronizing pulse, rather than only one line.

It is preferable that the direct and inverted waveform sequences be time-related to the television scanning process; consisting of either an integral number of lines or an integral number of fields. The coding signal modulation component produced at the transmitter to keep the receiver in proper time sequence is caused to occur when the image-producing process is not taking place, as during the "back-porch" of the blanking interval between lines or between fields. In this way the video signal per se is not altered by the "scrambling" sequences.

The remaining waveforms of FIG. 1 are considered later.

Figure 2:
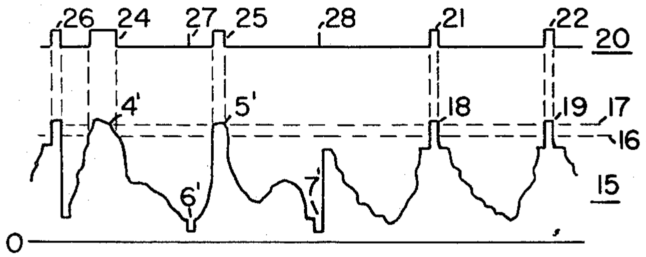
FIG. 2 indicates non-operation of the synchronizing circuits of a television receiver when fed this waveform.

FIG. 2 shows how an unauthorized receiver malfunctions upon receiving transmissions originated according to this invention.

Waveform 15 contains both video and synchronizing information as it is reproduced by an unauthorized television receiver. Such information is normally applied to the image-reproducing cathode-ray picture tube, and to the synchronizing circuits for effecting synchronization. Lines 16 and 17 are both parallel to the 0 axis shown and the space between them indicates the clipping level interval amplitude within which the synchronizing circuits accept signals.

The time scale of FIG. 2, the abscissa, is the same as that of FIG. 1 and the waveforms are aligned with the waveforms of FIG. 1. Examining first the right-hand side of FIG. 2 it is seen that synchronizing pulses 18 and 19 lie within clipping level interval 16–17. Accordingly, these pulses are reproduced separately from the video information in waveform 20 at 21 and 22, respectively. This provides normal line synchronization for the television receiver, being properly timed and shaped.

At the left of FIG. 2, white video peaks 4' and 5', corresponding to carrier-wave peaks 4 and 5 of FIG. 1, are seen to also lie within the clipping level interval 16–17. Accordingly, these produce spurious synchronizing pulses 24 and 25 in waveform 20. Most seriously, these pulses are mis-timed. Proper timing is indicated by pulse 26, which was properly produced at the last of the negative polarity transmissions. The next horizontal synchronizing pulse should occur at the time of synchronizing pulse 6', represented by a single vertical mark 27; but nothing does occur at that time. Synchronizing pulse 6' is completely away from the clipping level interval; actually at extreme video white. The same situation obtains with respect to white peak 5'; pulse 25 being seriously mis-timed from its proper position at 28.

Depending upon the composition of the image being transmitted there may be a considerable number of false synchronizing pulses produced in a line of image scanning; or in some unusual images there may be none. In any event it is seen that the disruption of synchronization is sufficient to destroy the image. Moreover, synchronization circuits have a relatively long time constant, which acts to continue malfunctioning for some time after false synchronizing pulses are produced.

Should the polarity of transmission be reversed each thirty fields, a time duration of one-half second, it is seen that the unauthorized receiver is quite often missynchronized by white image signals, and so no intelligible image can be reproduced upon it. The complete loss of understandable visual information by random non-synchronization of the horizontal scanning is well known to those skilled in the art, and to the public as well.

Figure 3:
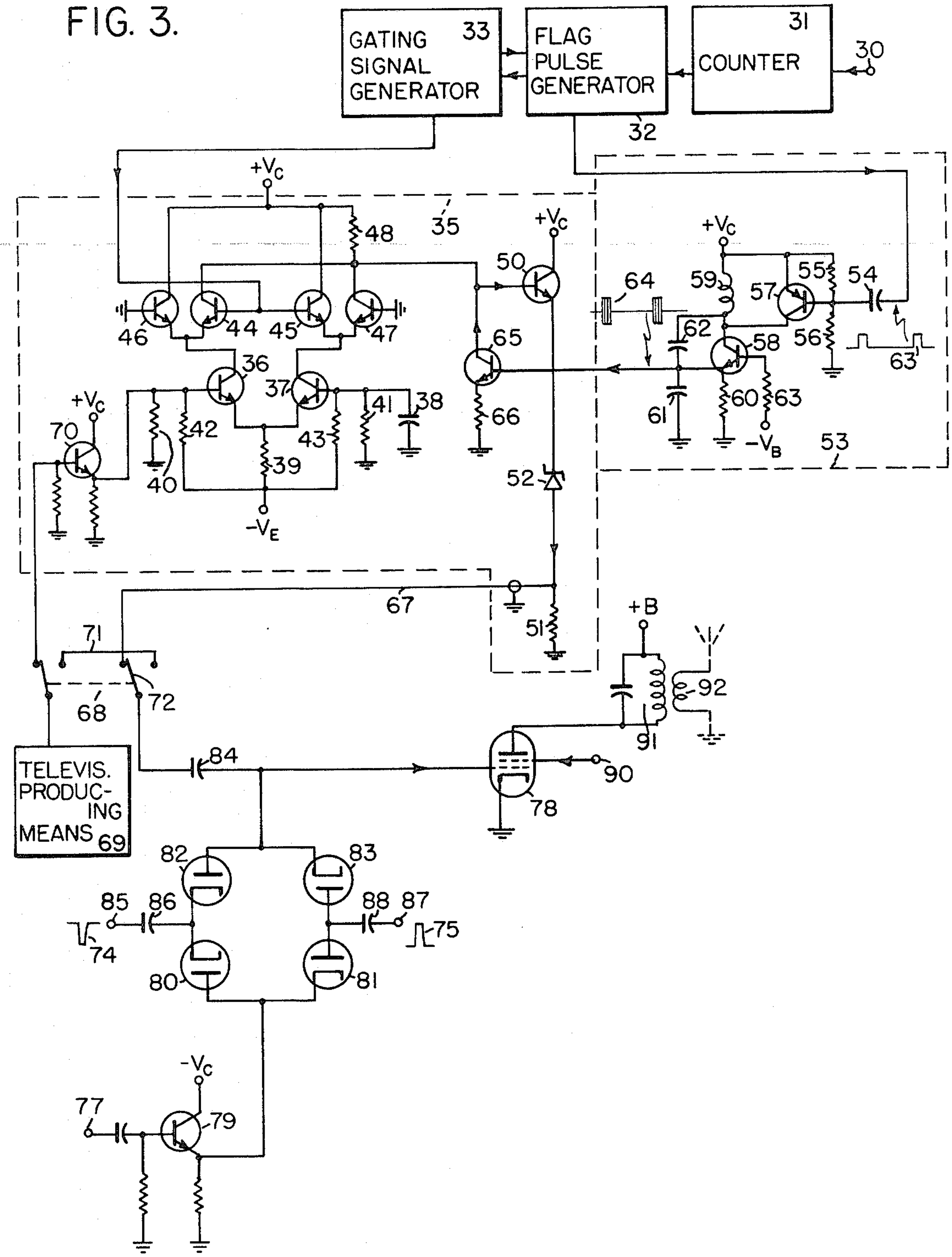
FIG. 3 shows the major circuit of the encoding apparatus as used at the transmitter.
Figure 11:
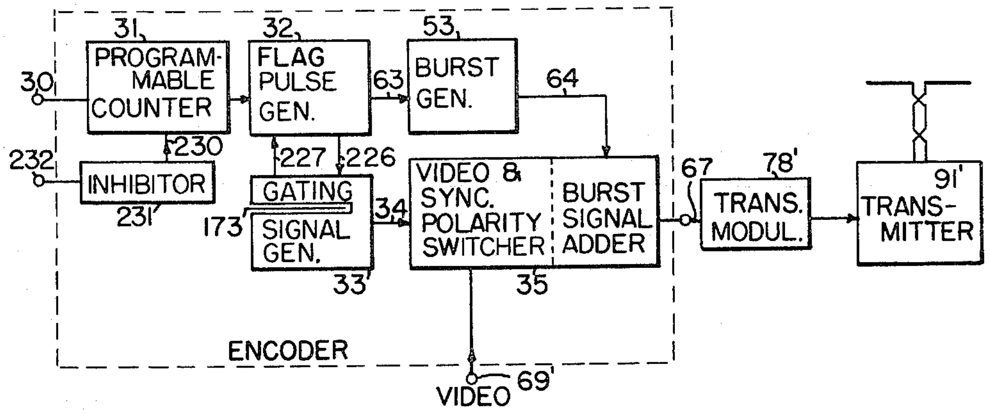
FIG. 11 shows the major components of the encoder in block form, and its relative position in the television transmitting apparatus.

FIG. 3 shows the major circuit of the encoding apparatus used at the transmitting station, including a bias circuit for the modulator of the transmitter. The latter is required for the effective use of transmitter power with the polarity-inversion type of transmission according to this invention. FIG. 11 shows the major components of the encoder and its place in the television transmitting system, in block form.

In either figure, terminal 30 receives either horizontal or vertical drive pulses, depending upon whether the reversal interval is to be a period of time required to scan a number of horizontal lines or to scan a number of vertical fields. Herein the explanation follows the United States standard for monochrome or color in which there are 525 lines, interlaced at 60 fields per second (of half that number of lines), with 30 frames of complete image per second. However, the method and apparatus of this invention is applicable to any number of lines and images per second, interlaced or not, and for other modes of coding rather than the reversal of polarity of radio frequency modulation.

At all television camera equipment used for forming image signals for transmission, both horizontal and vertical (field) drive pulses are produced by the scanning apparatus in order to deflect the electron scanning beam over the image-producing plate and for other purposes, such as for initiating synchronized scanning for television image monitors. Thus, either of these series of pulses may be supplied to terminal 30 by a simple switch, or plug and jack connection, as is known and thus is not shown in FIGS. 3 or 11.

Counter 31 employs circuitry commonly known in the art as a "preset", "programmable" or "batch" type counter, in that the number of counts can be preset by means of a switch to allow the counter to count a selected number of incoming pulses before resetting itself to zero, to begin a new and similar count. The counter may be a binary, staircase step, unijunction, or other type capable of counting horizontal or vertical timed incoming pulses, as the case may be. Circuits adaptable to this use are available at low cost in integrated circuit form, such as the RCA CE-4018.

Figure 9:
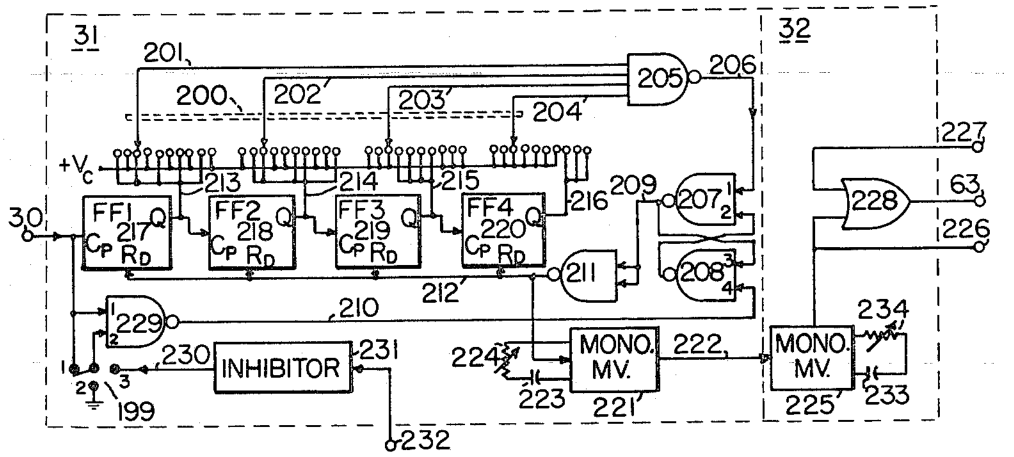
FIG. 9 shows details of the programmable counter and flag pulse generator.
Figure 10:
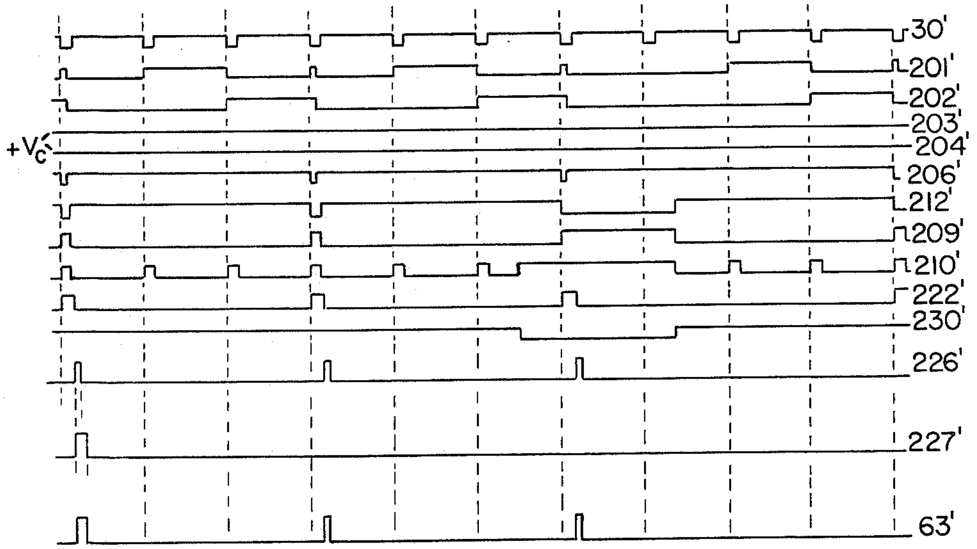
FIG. 10 shows details of the waveforms produced by the devices of FIG. 9.

FIG. 9 shows details of the programmable counter and flag pulse generator circuits, while FIG. 10 shows the waveforms of the signals produced.

Vertical or horizontal drive pulses 30′ are counted down by programmable counter 31, regulated by either an operator-controlled switch 200 (dotted), or by a random produced noise pulse 230′ from counter inhibitor 231, or a combination of both.

The main purpose of this programmable counter is to vary the subharmonic repetition rate of flag pulse 63, in case unauthorized television receiver operators are able to decipher the code sequence of the punched hole cards. This is added protection to the encoding process as obtained from the cards, and as will be described later, authorized television receivers with decoders will automatically decode any erratic or programmed interruption of the flag burst pulses along with the decoding as afforded by the punched cards.

As an example of the programmable counter operation with the circuit of FIG. 9, the count-down selector switch 200 is shown set for a count of 3 ($n = 3$) incoming drive pulses 30. In this configuration, the last state of a desired count ($n - 1$) must be such that all gate inputs 201, 202, 203 and 204 into nand gate 205 are at a plus level. When this occurs, the output of this nand gate will drop to a 0 level, as shown by waveform 206′ of FIG. 10.

Nand gates 207 and 208 are connected in flip-flop fashion in a circuit commonly called a "latch" circuit. If a 0 level is applied to gate 1 of nand 207, the output level at conductor 209 flips to a plus level. It stays there until the next negative-going pulse signal transition to 0 level at gate 4 of nand 208 flips the output level 209 back to 0 level. This is shown at waveform 210′.

When the desired count of $n-1$ is reached, all inputs to nand gate 205 are at a plus level, forcing the output signal thereof 206 down to a 0 level. This flips the latch circuit output level at 209 to a plus level. This level is inverted by nand gate 211 to a 0 level signal as shown by waveform 212′. This 0 level is applied to all Reset (R*d*) inputs of all flip-flops 217, 218, 219 and 220, forcing all Q outputs 213, 214, 215 and 216 to 0 level.

As explained above, the next occurring negative-going pulse transition from the inverted drive pulse conductor 210 flops the latch circuit back to a plus output from nand 207, which is inverted by nand 211 to a plus level at conductor 212. This plus level applied to the reset (R*d*) inputs of all flip-flops allows the same to start counting in a normal fashion again.

The signal level 212, being used to reset all flip-flops, is also fed into monostable multivibrator (a "one-shot"), which generates a single output pulse for every negative-going level transition at its input. Its output pulse width is independent of the characteristics of the input pulse, but can be controlled by (adjustable) external resistor 224 and capacitor 223. Many embodiments of one-shot circuits are available at low cost in integrated circuit form; such as the Motorola MC-851 and the Texas Instruments SN-74121. The output waveform is shown at 222′.

Two widths of flag pulse are generated. A short (narrow) width pulse is generated by nonostable multivibrator 225. This is initiated by the negative-going transition of pulse 222′. This short flag pulse 226′ is used for triggering the binary counters in gating signal generator 33. When these counters have completed a full counting sequence a long (wider) pulse 227′ is generated by that unit and fed back to the flag pulse generator. This is added to the short pulse by adding circuit 228. The combined output signal at 63, waveform 63′, is thus a series of short flag pulses plus a long flag pulse each time gating signal generator 33 completes a counting sequence.

As previously mentioned, capacitor 223 and resistor 224 are used to control the pulse width monostable multivibrator 221. Since the connected short flag pulse generator 225 is triggered from the trailing edge of the negative-going transition of the pulse from multivibrator 221, resistor 224 can be used as a fine control for delaying the start of the pulse output from generator 225. This allows the short flag pulse, and therefor burst flag signal at 64 in FIG. 11 to be properly timed with respect to the rest of the video-synchronizing signal that is broadcast.

For normal counting, mode switch 199 of FIG. 9 is in the position shown, in which incoming drive signals 30′ (FIG. 10) are applied to both gates of nand inverter 229. It thus acts as an inverting amplifier.

On the other hand, if mode switch 199 is turned to the grounded contact, the 0 level at gate 2 of nand 299 prevents drive pulses 30 on gate 1 from passing through, forcing the output level at 210 to be plus. Thus, after completion of a selected count by flip-flops 217 through 220 the "latch" circuit becomes "stuck"; that is, it will not return the reset plus level to the R*d* inputs of the flip-flops until gate 4 of nand 208 becomes 0 level again. Accordingly, as long as gate 2 of nand 229 is grounded the counters will not count and gate pulses will not be generated. This position of mode switch 199 thus inhibits the encoding process and allows the broadcast transmissions to be normal and receivable by non-authorized receivers as well as receivers with decorders (which decoders do not contribute to the function of television reception under such conditions.)

In order to avoid a fixed count in generating the final burst flag signal and to allow the programmable counter 31 count to be varied in a random sequence, an additional switch 199 position is provided for connecting counter-inhibitor 231 to nand 229 gate 2. When the pulse from the inhibitor is at a plus level, nand 229 allows the counters to count to the selected count. When the pulse from the inhibitor is at a 0 level gate 2 does not allow pulses to pass through nand 229, thus stopping the counters as has been explained before for the ground contact.

Counter-inhibitor 231 is essentially a pulse generator capable of generating pulses of variable duration and frequency, such as might be triggered by thermal variations, or as synchronized to an external noise source via terminal 232. In essence, counter-inhibitor 231 stops the counters for a finite period of time and then allows counting to resume for a finite period of time. This is intermittently, and preferably for periods shorter than a half-second.

Capacitor 233 and selectively variable resistor 234 control the duration (width) of the short flag pulse generated by monostable multivibrator 225. The width of long flag pulse 227' is controlled in gating signal generator 33.

From FIGS. 3 and 11 it can be seen that the flag pulse signal 63' of FIG. 10 is fed into burst generator 53, where it is used to gate ON a sub-carrier oscillator for a length of time corresponding to the width of the burst flag pulse. The length of time and the frequency of the subcarrier oscillator depend upon whether the burst is added to the horizontal blanking for monochrome transmissions, or preferably to the vertical blanking for either monochrome or color television transmissions.

Figure 12C:
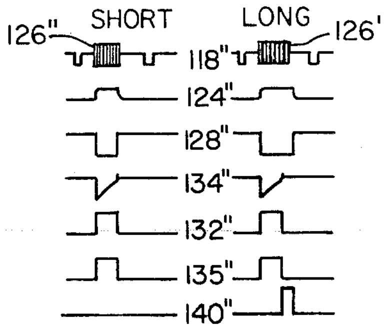
FIG. 12C shows pulse width selector waveforms.
Figure 12A:
FIGS. 12A and 12B shows the addition of a flag burst to a television waveform.

When the burst is added during the vertical blanking interval, as shown in FIG. 12A, time durations of from five to fifteen microseconds of one megahertz sub-carrier frequency are usual for the short burst flag intervals 126. The long burst duration 126' is one and one-half times that of the short burst. This difference in duration insures reliable separation of the short and the long bursts at the decoder, particularly under conditions of noise and interference in television reception. The change in polarity of the video and synchronizing information is shown in FIG. 12A in time relation to the vertical blanking interval. The transition takes place after the last equalizing interval when the burst is so located. Loss of interlace is not to be expected. The burst is an a.c. signal of comparatively high frequency and it is not passed by the vertical integrating circuits in the decoder or in the receiver.

Figure 12B:
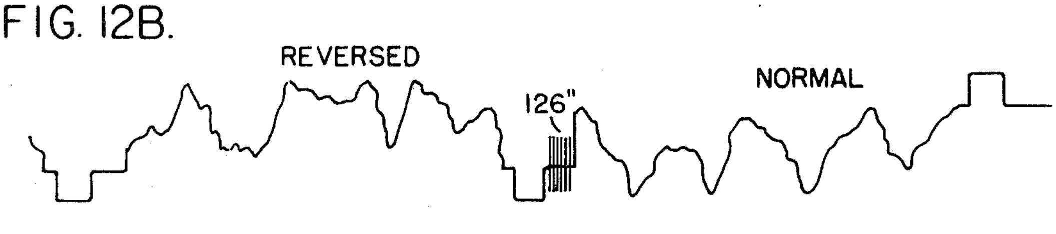

When the burst signal is added during the horizontal blanking interval for monochrome (black & white) transmissions as shown in FIG. 12B, a time duration of 2.25 microseconds of 3.0 megahertz sub-carrier is useable for the short flag burst intervals, with 3.25 microseconds duration for the long flag burst interval. The change in video- synchronizing polarity takes place within a half microsecond or less after the flag burst.

Figure 5:
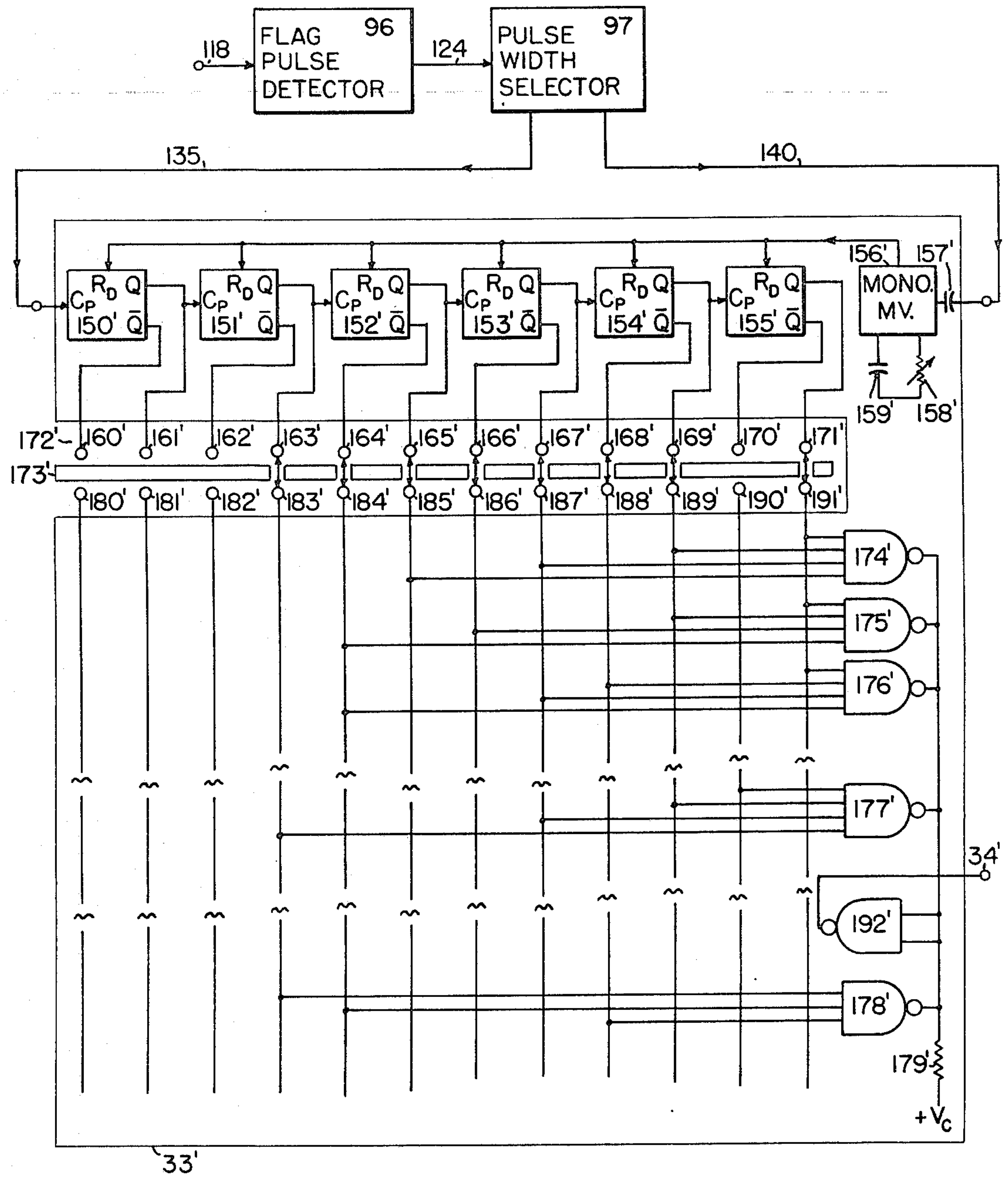
FIG. 5 shows the gating signal generator circuit as used at the decoder.
Figure 6:
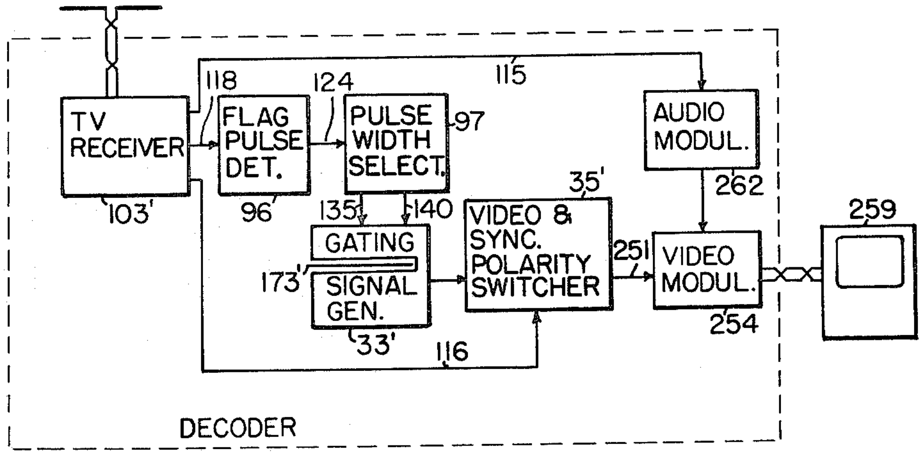
FIG. 6 shows the major components of the decoder in block form, and the relation thereof to the subscriber's television antenna and receiver.

Gating signal generator 33 of FIG. 3 contributes to the coding process in essentially the same way that gating signal generator 33' of FIG. 6 contributes to the decoding (reverse) process. An example of the internal apparatus of these generators is given in FIGS. 4 and 5, respectively. The purpose of these generators is to provide a predetermined sequence of coding, of which alternation of video-synchronization polarity is an example, that is resident in information separate from that that is transmitted "over-the-air". Typically, this is in the form of a punched card used at the transmitter, with duplicates available for purchase and use by a subscriber in a decoding unit attachable to his television receiver.

The apparatus contained within dotted rectangle 35 in FIG. 3 comprises the video polarity switcher of the encoder. Two amplifier stages are provided; one in which the video and synchronizing signals are allowed to pass through without inversion of polarity and another in which the polarity is inverted. Which output is made available to the succeeding circuits is determined by the absence or the presence of gating pulses from gating signal generator 33. When the normal negative polarity of radio frequency transmission is to be accomplished a gating pulse is not provided. When the inverted polarity of radio frequency transmission is to be accomplished a gating pulse is provided.

The essence of video polarity switcher 35 is the differential amplifier comprising NPN transistors 36 and 37. Assume for the moment that the collector of each of these transistors has an individual load resistor, each of the same resistance value. With a video signal having synchronizing pulses in the positive direction applied to the base of transistor 36 an inverted signal would appear across its individual load resistor; the synchronizing pulses now being in the negative direction.

The emitter signal of transistor 36 is the same as its base signal. The base of transistor 37 is grounded to significant alternating current signals by capacitor 38, which is connected thereto and to ground. Transistor 37 is thus driven by the emitter signal of transistor 36, there being the common emitter resistor 39. This resistor is made relatively high in resistance value, or a known constant current source substituted for the same; thus, the collector signal of each of the transistors will be very closely equal in amplitude but of different video-sync pulse polarity. The d.c. collector current through each transistor is inherently equal, and may be adjusted to equality if required by trimming the bias resistors 41 and 43 to either increase or decrease its operating bias. A common practice is to make one of the resistors a higher than normal value, and of the adjustable type, so that a very fine bias balance adjustment can be made.

Companion resistors 40 and 42 supply operating bias for transistor 36 in a similar manner.

The circuit of switcher 35 also includes additional differential amplifiers 44 with 46 and 45 with 47; which, along with single resistor 48, takes the place of the two collector load resistors previously mentioned for tutorial purposes.

It is a property of differential amplifiers that when the bias to both transistors thereof is the same both transistors will equally share the constant current supplied to their common emitters. If, however, the base of either transistor is made slightly more positive, as by only a few tenths of a volt, that transistor passes all of the current available and in the process biases-off the other transistor.

In the second differential amplifier the bases of transistors 44 and 45 are connected together and to the output of gating signal generator 33. All of the transistors of switcher 35 are of the NPN type. The emitters of transistors 44 and 46 are connected together and to the collector of transistor 36. Similarly, the emitters of transistors 45 and 47 are connected together and to the collector of transistor 37. The bases of transistors 46 and 47 are connected to ground. The collectors of transistors 44 and 47 are connected together and to the signal output end of load resistor 48. The power supply end of that resistor and the collectors of transistors 45 and 46 are connected directly to the power supply, having the form of a positive voltage supply + $V_c$. This supply has a voltage compatible with the transistors used. It may be a battery with negative terminal connected to ground, or an equivalent regulated power supply similarly connected.

In the absence of a gate pulse from generator 33, the bases of transistors 44 and 45 are biased negatively. This leaves the grounded bases of transistors 46 and 47 more positive; therefore both of these transistors conduct current. The total collector current of transistor 36 thus passes through transistor 46 and so into the very low impedance of power supply + $V_c$. An output signal is not produced. The total collector current of transistor 37 passes through transistor 47 and generates a signal voltage across load resistor 48 that is not inverted; i.e., the output signal polarity is the same as that at the input.

When a gate pulse is received from generator 33, the bases of transistors 44 and 45 are biased more positively than ground, and these transistors conduct, biasing off transistors 46 and 47. The total collector current from transistor 36 now passes through transistor 44 and generates a signal voltage across load resistor 48 that is inverted in polarity. The collector current of transistor 37 passes through transistor 45 and into the low impedance of power supply + $V_c$ with no output therefrom being formed.

The resulting normal or inverted polarity video-synchronizing output is conveyed to the base of transistor 50, which has an emitter output resistor 51, connected to the emitter through zener diode 52. This diode allows the video signal to be d.c. coupled to the emitter load for minimum low frequency phase shift tilt, and its breakdown voltage rating is selected on the basis of the d.c. voltage appearing at the base of transistor 50, typically 10 to 15 volts. The zener diode may be replaced by a very large capacitor, if desired.

The burst flag oscillations per se are produced by burst oscillator 53. This is a relatively high frequency oscillator that is triggered ON for brief intervals by flag pulses from generator 32. A suitable frequency within the video pass bands of the transmitter and receiver circuits, and, as mentioned before, optimally selected at about 1.0 mhz when added to vertical blanking and about 3.0 mhz when added to horizontal blanking. The oscillator is turned on for the duration of the flag pulse, typically 10 microseconds and 15 microseconds of 1.0 mhz oscillations for the short and long flag pulses when added during vertical blanking, and 2.25 and 3.5 microseconds of 3.0 mhz oscillations when added during horizontal blanking.

The burst flag pulses from generator 32 are introduced to the burst oscillator 53 via capacitor 54, having sufficient capacitance to pass these pulses distortionlessly into the impedance formed by resistors 55 and 56 in parallel. The former is connected from the capacitor to supply voltage source + $V_c$, while the latter is connected from the capacitor to ground. These resistors provide a proper bias to the base of PNP transistor 57, the modulator of the oscillator circuit.

The emitter of transistor 57 is also connected to + $V_c$, while the collector is connected to the collector of NPN oscillator transistor 58, which collector is also connected to + $V_c$ through tuning inductance 59. The emitter of transistor 58 is connected to ground through resistor 60, and also through one of the oscillation capacitors 61. The second oscillation capacitor 62 is connected between the emitter and the collector of transistor 58. The base thereof is connected to a negative voltage supply − $V_B$ through resistor 63 to provide a suitable operating bias.

The waveforms involved are shown as pulses 63' from generator 32, being impressed upon the base of modulator transistor 57 and the radio frequency alternating current bursts of waveform 64', which are centered upon a zero axis.

Radio frequency bursts 64 are impressed upon the base of burst adder transistor 65, of the NPN type, the emitter of which is connected to ground through resistor 66. The collector thereof is connected to the base of transistor 50, from thence the bursts are added to the output from switcher 35.

The appropriately coded video and synchronizing information, along with flag bursts, passes from switcher 35 to the modulator portion of a television transmitter, typically through a coaxial cable 67, having a grounded outer sheath.

In the scramble system of this invention it is not necessary that the transmitter and the receivers involved be employed only for such secret operation. These items of apparatus are not altered and simple switching means at the transmitter and at the receivers allows transmission and reception of ordinary free television programs.

At the transmitter, double-pole double-throw switch 68 accomplishes this purpose. TV producing means 69 originates program material it is desired to transmit, whether it be "pay" or "free". Usually this consists of video and synchronizing information, along with color bursts if needed, for any type of television program; such as from a studio, from remote pickup, from video tape, or from motion picture film, in color, or in the black and white format. This signal is conducted to the left-hand arm of the switch. In the left-hand position of the switch arm shown this is passed on to an emitter-follower input-isolating stage of amplification of low impedance represented by NPN transistor 70. The emitter output thereof is connected to the base of differential amplifier transistor 36 and passes through switcher 35 as has been set forth.

When the left-hand arm of the switch is thrown to the right the switcher 35 is bypassed by conductor 71. Right-hand switch arm 72 then connects conductor 71 directly to the modulator apparatus of the transmitter and ordinary free television is transmitted. There is no reversal of polarity of image information, or other mode of coding. However, when arm 72 is thrown to the left, usually in concert with the left-hand arm by common means shown as the dotted line, the encoded output from the switcher and conductor 67 is conducted to the modulator apparatus of the transmitter.

While the transmissions with alternate changes in polarity can be transmitted by a television transmitter at some degree of reduced modulation without any modification of the transmitter, it is desirable to set the "black" or "sync tip" levels of the modulating waveform at the proper modulation bias levels for inverted as well as normal polarities.

In FIG. 1 the series of pulses 74 and 75 represent negative and positive clamping pulses, respectively. These occur at the horizontal scan repetition rate. When the transmitter is located at a location remote from the studio, or when programs originate at a remote location, these pulses are derived from sync. separator circuits in a stabilizing amplifier that forms part of the transmitter equipment. The pulses are normally used for minimizing hum and noise components in the television signal by re-setting the signal to a fixed level during the blanking period, a process termed "clamping".

The separated horizontal sync. pulses are at times used directly, in time phase, to re-set the sync. tips of the signal to a fixed level; or clamp pulses may be derived that are delayed in time so that clamping occurs during the blanking period after the sync., being usually referred to as "back porch" clamping. In either variation, clamp pulses are used at the transmitter modulator to insure that the sync. tips of the video-sync. signal are clamped to a fixed d.c. bias modulation level that will cause peak radio frequency (rf) energy to be generated, as required by United States television standards. When the polarity of the rf transmission is to be reversed, as in a typical embodiment of this invention, the sync. tips of the video-sync. signal must be clamped to a d.c. bias modulator level that causes only 10 percent to 15 percent of the peak value of rf energy to be generated. In summary, minimum bias to the modulator is required at the sync. tip intervals for peak rf generation for normal television transmission, while maximum bias is required to the modulator at the sync. tip intervals for reversed transmission.

Accordingly, the black or sync. tip level bias for modulator tube 78 of the transmitter is provided by waveform 76, which is an amplified sample of gating signal 34''. This is coupled through emitter-follower transistor 79, which acts as a low impedance bias voltage source for the clamp circuit return. Diodes 80, 81, 82 and 83, which may be vacuum tubes as shown, or semiconductor type diodes, are made to conduct only during the sync. signal periods by appropriate polarity clamp pulses 74 and 75. The remainder of the time they act as an open circuit.

When the diodes are conducting they act as a short circuit, connecting the grid of modulator tube 78 directly to the bias voltage as supplied by emitter-follower 79 and at the same time charging or discharging coupling capacitor 84 to the same bias voltage. When the diodes are turned off for the remainder of the video-sync.signal, the very high resistance of the grid circuit of the modulator allows very little of this bias charge to leak off. Essentially, the bias applied during clamp pulse time, plus the voltage excursions of the video-sync. signal become the whole source of the modulating signal.

For normal polarity of television transmission, the bias applied to a conventional modulator may be of the order of 0 volts, as shown by waveform 76. The video-sync. waveform voltage under such circumstances might be a negative-going voltage of approximately 20 volts peak in which the negative white peak would allow only 10 percent to 15 percent of maximum available rf energy to be generated in the plate circuit of tube 78.

For a polarity-reversed transmission, the bias would be of the order of − 20 volts and the video-sync. signal would be a positive-going voltage of approximately 20 volts peak. This would make a peak white signal extend to approximately 0 volts bias on the modulator grid and causing 100 percent of rf energy to be generated in the plate circuit of tube 78.

In the modulator, radio frequency energy is impressed upon a second grid of tube 78 through terminal 90. A known capacitor-inductor resonant circuit 91, tuned to the frequency of radio transmission, is connected to the anode of modulator tube 78, and also to a power supply + B, to energize the modulator tube.

An illustrative coupling inductor 92 is shown in inductive relation to the inductor of resonant circuit 91, and also connected to a dotted antenna and ground. This indicates the output of the transmitter. Power stages of radio frequency amplification may be interpolated between resonant circuit 91 and inductor 92, as well as known sideband attenuating circuits. Known preliminary rf stages that provide rf input to terminal 90 also have not been shown. At usual television transmission frequencies the antenna is usually a multiple array of dipole radiators and there is no specific connection to ground. Since this apparatus is known the simple illustration of a television transmitter of FIG. 3 suffices.

Figure 7:
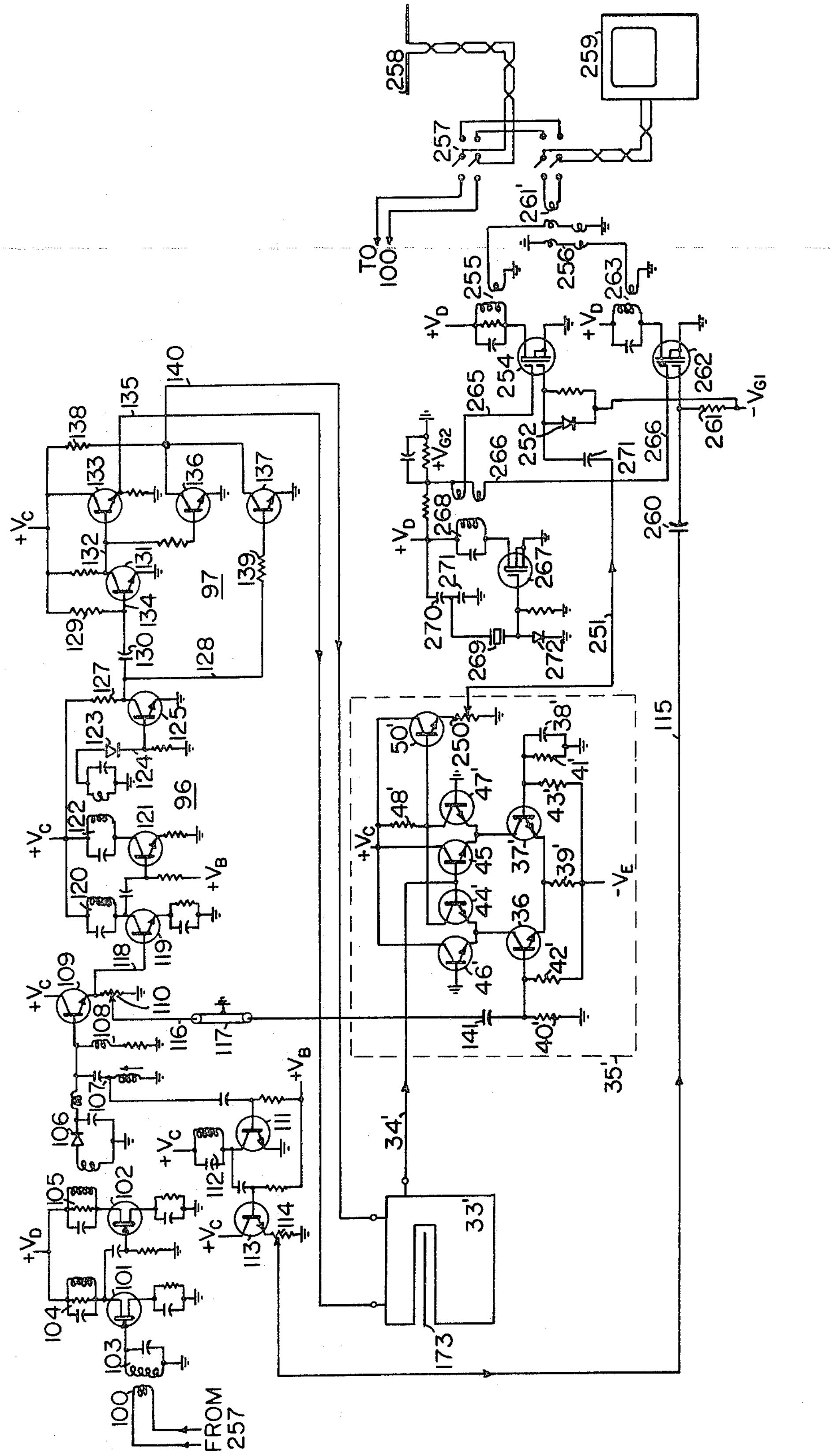
FIG. 7 shows simplified circuit details of all circuits in the decoder, other than that of the gating signal generator.

FIG. 7 shows an illustrative and simplified tuned radio frequency receiver for decoding use, ahead of the conventional television receiver in subscriber's home application. A known super-heterodyne circuit may be used instead.

Inductor 100, used with tuned circuit 103, matches the impedance of the receiving antenna to the input impedance of amplifier 101 for maximum signal voltage transfer of radio frequency energy of the various television channels. This relatively feeble energy is amplified by amplifiers 101 and 102. The transistor of amplifier 101 is shown as a FET, with rf resonant circuit 103 connected to the input and rf resonant circuit 104 connected to the drain output. These are known resonant circuits, tunable from one television channel to another and having sufficient bandwidth to pass the full video signal, including the 1 to 3 mhz flag burst signals previously described.

The video frequencies and the 4.5 mhz frequency modulated audio carrier are detected by diode detector 106. Low pass filter 108 attenuates all frequencies above 4.5 mhz, leaving only the video signal and the audio carrier. The audio carrier frequencies are attenuated by high Q filter 107, which, at the same time, couples the extracted 4.5 mhz carrier to the base of amplifier 111, where it is further amplified. Tuned circuit 112 provides further 4.5 mhz amplification, the resulting signal being coupled to a low impedance output through the emitter-follower action of amplifier 113. Gain potentiometer 114 is used to select the amplitude of the output signal at 115 as desired.

Video frequencies as passed by low-pass filter 108 are coupled to a low impedance output by emitter-follower amplifier 109, with the signals appearing across potentiometer 110. The amplitude level of the video signals at 116, as selected by potentiometer 110, is fed by coaxial cable 117 to the input of video-sync. polarity switcher 35', where the video signal polarity reversals are decoded and converted to one polarity. Coaxial cable 117 is also used to slightly delay the video signals to match the switching time of the gate pulse transitions from gating signal generator 33'.

Simultaneously, the video signal 118 appearing across the total resistance of potentiometer 110 is fed to the input of amplifier 119, where only the flag burst sinusoid signal as selected by tuned circuit 120 is amplified. As previously explained, this signal frequency is of the order of 1.0 mhz when the flag burst signal is preferably added during the vertical blanking interval, and of the order of 3.0 mhz when the flag burst is added during the horizontal blanking interval.

In describing the circuit action it is assumed that the flag burst frequency is 1.0 mhz, the duration of the short flag burst is 10 microseconds, and the duration of the long flag burst is 15 microseconds.

Accordingly, the 1.0 mhz sinusoid frequency in the video signal at 118 appears amplified across tuned circuit 120, with all other frequencies attenuated. To further attenuate any remaining video signals, the 1.0 mhz signal is again amplified by amplifier 121, with the resulting 1.0 mhz signal appearing across tuned circuit 122. This signal is fed from a low impedance winding coupled to circuit 122 to detector diode 123, where the burst is converted into a pulse type signal 124'', and then fed into amplifier 125. See FIG. 12C.

The base of transistor amplifier 125 is the input to the pulse width selector circuits, the purpose of which is to select or indicate the presence of the long flag pulse separately from the short flag pulse. The short flag pulse is continuously required because it is used for triggering the binary counters of the gating signal generator to produce decoding gate signals. The long flag pulse is added to the original signal only when the full count-down sequence of the binary counters in the gating signal generator at the encoder has been completed. The reception of the long flag pulse is simultaneously used to re-set all of the binary counters in the local (receiver) gating signal generator, so that both transmitter and receiver generators start counting from zero at the same time and in step.

All binary counters and switching circuits are triggered from the trailing negative-going slope of all short flag pulses, and the binary counters in all decoders are re-set to zero count at the trailing negative-going slope of the long flag pulse.

The positive-going flag pulse signal 124'' at the base of amplifier transistor 125 causes it to conduct heavily, the transistor is in "saturationIts saturation". impedance is very low, resulting in a very low collector signal voltage, of the order of + 0.2 volts peak, being developed across it. The remainder of the supply voltage + $V_c$ is dropped across the very much larger collector resistance 127.

In the absence of a flag pulse, amplifier 125, a "switching amplifier", becomes biased off to non-conduction due to its internal junction bias. Accordingly, there is no flow of collector current and the full + $V_c$ * (*Less a small voltage drop due to base current of transistor 137.) supply appears as the signal voltage, and signal voltage 128'' at 128 is always + $V_c$ in the absence of a flag pulse, or only + 0.2 volt during the duration of the flag pulse. The transistion time between these levels is usually very rapid, being of the order of less than 0.1 microsecond.

Switching amplifier 131 is retained in heavy conduction (saturation) by self-bias resistor 129, resulting in a collector potential of only + 0.2 volts. The input pulse signal 128 is differentiated by resistor 129 and capacitor 130. This differentiated signal 134'', of FIG. 12C, is derived from the negative-going transition of pulse 128 and has a large negative amplitude. It biases off switching amplifier 131 for the time it takes capacitor 130 to charge back to its normal potential, at which time the amplifier goes back into saturation again. During the biased-off time of switching amplifier 131 its collector voltage rises toward + $V_c$, thus generating a positive pulse signal voltage 132'' for the period of time it is biased-off.

For the present application the discharge time constant of resistor 129 and capacitor 130 is selected to match the duration of the short flag pulse; i.e. 10 microseconds. This pulse 132 is fed to emitter-follower amplifier 133, for transmission at low impedance as signal 135'' to the binary counter input of gating signal generator 33'.

Switching amplifiers 136 and 137 are connected in a NAND circuit configuration. Both base inputs must be below + 0.6 volts (the base junction bias) simultaneously in order for the full + $V_c$ voltage to appear at the common collector terminals thereof. If either amplifier is biased well above the 0.6 volt positive value it will saturate, causing the common collector voltage to drop to + 0.2 volts.

In the quiescent state when there are no flag pulse signals, the potential at the base of switching amplifier 136 will be less than 0.2 volts because switching amplifier 131 is in self-biased saturation. Switching amplifier 137; however, is biased into saturation by the base current through resistor 139, as caused by + $V_c$ appearing at the collector of switching amplifier 125. This causes the common collector signal voltage of both 136 and 137 to be + 0.2 volts because one of the base inputs is positive.

When a negative 10 microsecond flag pulse signal 128'' is generated at the output of switching amplifier 125 the output drops to + 0.2 volts. This is simultaneously applied to the base input of switching amplifier 137 for 10 microseconds, and also as a differentiated negative polarity signal to switching amplifier 131, which generates a positive 10 microsecond pulse signal 132'' at the collector thereof. This positive pulse is applied to the base of transistor 136 at the same time as the low 0.2 volts is applied to the base of transistor 137. The common collector output signal voltage of both of these transistors remains at + 0.2 volts because one of the base input signals is still positive. In other words, a 10 microsecond flag pulse signal does not appear at the output across resistor 138 because at no time did both bases go to 0.2 volts at the same time.

Assume now that a long 15 microsecond flag pulse is generated at the output of switching amplifier 125. As before, the output drops to 0.2 volts, which is simultaneously applied to the base of transistor 137 for 15 microseconds, and also as a differentiated negative polarity signal to transistor 131, which generates a positive 10 microsecond pulse signal 132'' at its collector. This positive 10 microsecond pulse is applied to the base of transistor 136 at the same time as the 15 microsecond 0.2 volts is applied to the base of transistor 137. The common collector output voltage of both transistors 136 and 137 will remain as before at 0.2 volts for the duration of the 10 microsecond pulse applied to the base of transistor 136.

However, at the end of 10 microseconds switching amplifier 131 goes back into saturation. This now means that the inputs to the bases of transistors 136 and 137 are both low, which cuts both transistors off and allows the common collector potential to rise to $+V_c$. This collector signal remains at $+V_c$ for the next 5 microseconds, during which time both bases are at 0.2 volts. At the end of 15 microseconds the long flag pulse signal at the input to the base of transistor 137 goes positive, causing this transistor to again saturate. This in turn causes the common collector signal to return back down to its 0.2 volt level again.

The net effect of this circuit action is that during the last 5 microseconds of the 15 microsecond long flag pulse signal, a positive 5 microsecond pulse signal 140'' is gnerated and is fed to the re-set amplifier input of gating signal generator 33', where the trailing negative-going slope of the pulse is made to return all binary counters to zero.

The approximate signal voltage waveforms appearing at the various inputs and outputs of FIG. 7 are shown in FIG. 12 with corresponding double-primed ('') numerals. These are in time phase, for both the short and the long flag pulses.

The manner in which the desired polarity inversions or equivalent sequences are accomplished in the operation of the system can be derived for both coding and decoding by considering gating signal generator 33. Except for the method by which the counters are re-set to zero at the completion of each coding sequence the gating signal generators at the encoder (33) and all decoder (33') locations are similar and operate in the same manner.

Figure 4:
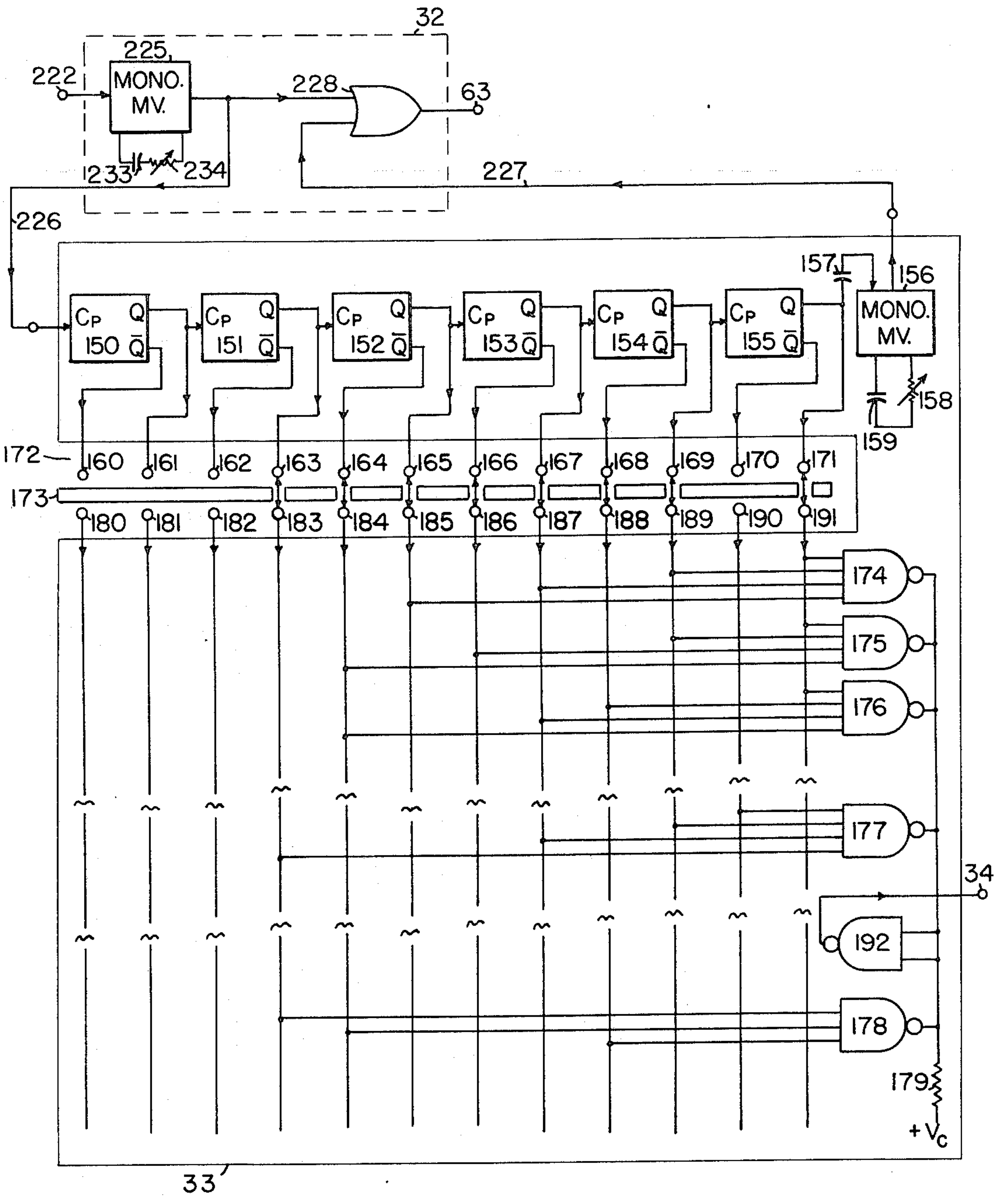
FIG. 4 shows the gating signal generator circuit as used at the encoder.

Referring to FIG. 4, the basic functions of the device are described as follows. A chain of binary counters, either in serial or parallel connected form, is sequentially triggered by the incoming narrow flag pulses. At the Q and minusQ outputs of each binary flip-flop, a light-emitting diode is used to indicate its ON or OFF state. The light-emitting diodes, commonly known as "LED's", are solid state devices which take minimal power and can be directly activated by binary output signals. Examples are the General Electric type SSL–22, which emits visual illumination, and the type SSL–4, which emits infrared radiation near the visual region.

The light emitting diodes are physically small, like transistors, and can be arranged mechanically in a criss-cross matrix arrangement. For example, when 15 binary stages are used, 30 LED's are required and can be arranged in five rows of six lamps spaced one-half inch from each other. LED's can also be purchased already mounted in rows, such as used for punched card readers, similar to the Monsanto type MV5040.

Suspended immediately below the light emitting diodes, within a half inch spacing or more and in the same mechanical matrix spacing arrangement are 30 photon detectors. These may be photo-diodes or photo-transistors, similar to the General Electric type L14B, for receiving the light or the infrared flux from each LED.

With 15 binary counters, as an example, it is possible to digitally count to $2^{15}$ or 32,768 input flag pulses. For each and every one of the counts there will be a different combination of the 30 light emitting diodes excited, illuminating a corresponding combination of photon detectors. If another binary counter with its two LED's and photon detectors were added the number of combinations possible doubles to 65,536, and so on.

If now, punched hole card is inserted between the LED's and the photon detectors it is possible to select a finite number of counts out of the 32,768 possible combinations by punching out the appropriate holes and connecting circuit logic, which accomplishes the addition of the various pulses generated by the photon detectors, to make this so.

As an example, if two holes were punched out to allow the light flux to pass through the card when the LED's are excited by the Q outputs of the first and third binarys, the "anded" output of the photon detectors would produce a gating pulse at the output for reversing the signal polarity at every fifth count of the short flag pulses. If an additional hole is punched out to allow the light flux to pass through when the Q output of the fourth counter is excited, the "anded" outputs of the photon detectors would produce another gating pulse, in addition to the above, for reversing the signal polarity every 13 count. If still another hole is punched out to allow light flux to pass through when the Q output of, say, the seventh counter is excited, the "anded" outputs would produce still another gating pulse in addition to the two above, for reversing the signal polarity every sixty-nineth count, and so on.

By preselection of the AND circuit combinations wired into the logic matrix connections, many combinations of reversing gate pulses can be selected and the sequences varied by the selection of hole positions punched through the card.

The punched hole cards are intended for only a relatively brief period of use, as for one particular program, for one week, or for one month. Thereafter a new card is issued. It is thus rather difficult and expensive for the operator of an unauthorized television receiver to simulate circuitry for decoding, since this would have to be done repeatedly. Also, the programmed counter at the television transmitter can be varied in count down in producing the flag pulses. This can be accomplished at any time; during a program, for a particular program, on a weekly basis with monthly punched cards, etc. or even constantly on the random noise control basis that has been described. This varies the length of the generated gate pulses in proportion to the programmable count down. Since the punched card actually produces the encoding and the decoding, it does not matter how the flag pulses are spaced in time.

Figure 8:
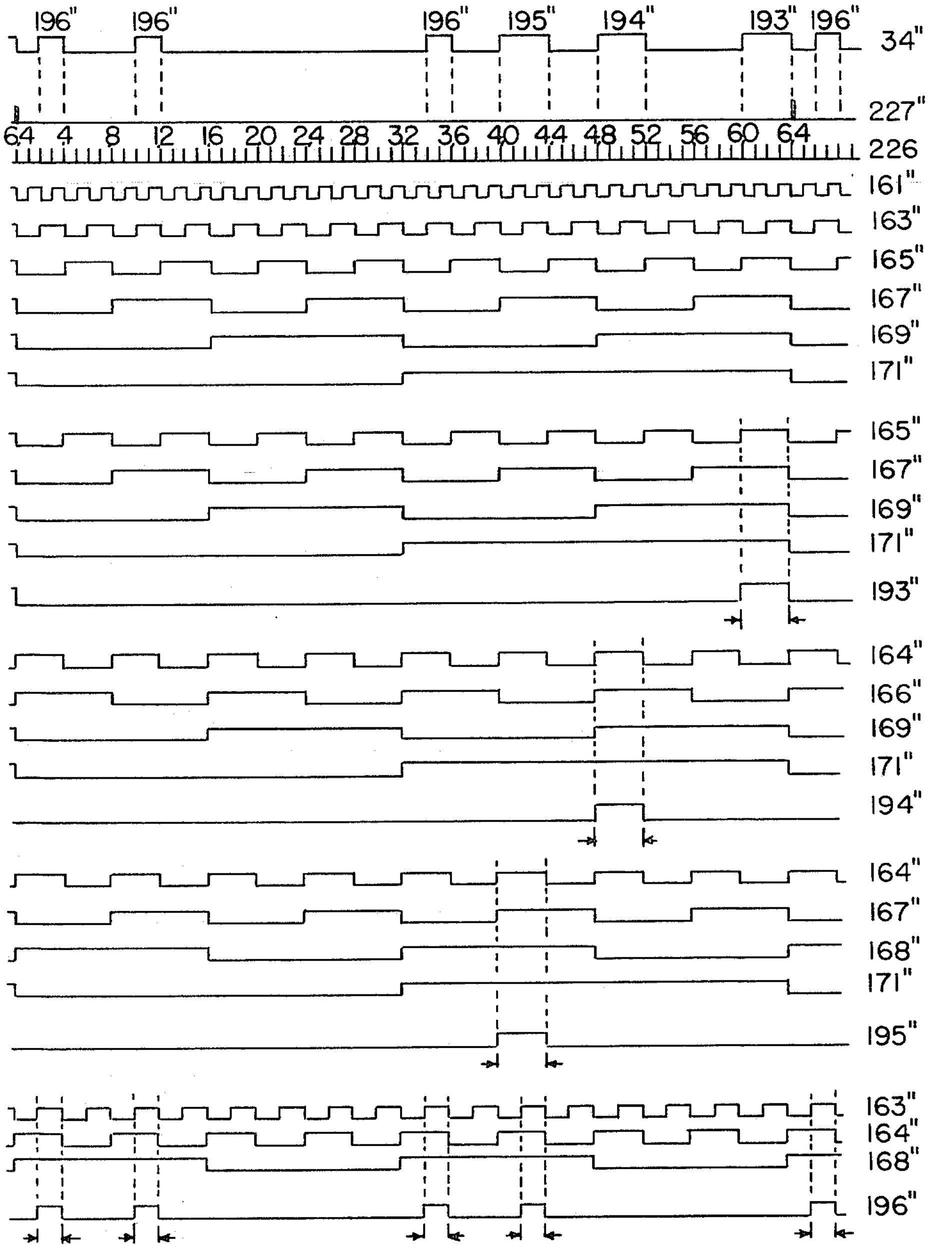
FIG. 8 shows typical gating signal generator waveforms.

The gating signal generator shown in FIG. 4 has only six binary counters in order to simplify the coding explanation. It is used at the encoder. That used at the decoder is shown in FIG. 5. The generator voltage output waveforms are identical for either unit and these are shown in FIG. 8.

All of the gate circuits, the counters, and the monostable multivibrator circuits used in the gating signal generator may be of the integrated circuit type, such as the similar well-known Texas Instruments 54/74 series. Hybird types may also be used, at greater expense.

The function of the NAND gate circuits 174 through 178 is such that all gate inputs to an individual gate must be a positive voltage, normally above + 2.0 volts, to produce a zero level output. In this state the output transistors in the gate circuit are conducting heavily and practically short the common gate outputs to ground. If any one or more of the gate inputs to an individual gate cicuit is below + 0.8 volts, the output transistors do not conduct and the output remains at + $V_c$ level.

Accordingly, all gate inputs must be positive to any one of the gate circuits 174 through 178 to produce a zero level output signal across the common gate circuit load resistor 179. Inverter amplifier 192 reverses this shift in level, producing a positive output gating pulse 34'' each time a zero level occurs at its input.

Six binary counters 150 through 155 are shown in FIG. 4. This allows a complete counting sequence of $2^6 = 64$ counts before recycling. The binary output waveforms from 160'' through 171'' from each of the counter outputs are indicated, where applicable, in FIG. 8. These outputs may be either directly connected by spring contacts through punched hole card 173 to the gate inputs of the NAND gates 174 through 178, or preferably photo-electronically by light emitting diodes 160 through 171, emitting visual or infrared energy through the punched holes of card 173 to photon detectors 180 through 191, respectively. This latter method is known as "photon coupling". Note that except for the double primes the light emitting diodes are given the same identifying numbers as the waveforms that excite them. When a binary Q outputs goes positive, it is convenient to assume that the LED is excited and that the light energy collected by the coupled photon detector produces a positive pulse at the gate inputs.

As the binary counters are triggered by short flag pulses 226, the Q output waveforms generated are given in the first six waveforms 161'', 163'', 165'', 167'', 169'' and 171 of FIG. 8 to show the timing relationship, one to the other. At the conclusion of the 64th count, the negative-going slope of last binary output waveform 171'' is coupled through capacitor 157 to monostable multivibrator 156, triggering it into conduction for 15 microseconds in our example, as determined by resistor 158 and capacitor 159. This generates long flag pulse 227'', as has been previously described, and is significantly used to reset all decoder binary counters to zero. At the next flag pulse at either the encoder or the decoder, all binary counters will start with the count of one simultaneously and will keep in step until recycled again.

Of the five NAND gates shown, it is seen that NAND gate 174 is connected so that when LED's 165, 167, 169 and 171 are simultaneously activated, with the light flux collected by the corresponding photon detectors 185, 187, 189 and 191, a positive voltage is applied to each gate input of 174, causing a negative or zero level voltage to be generated across common load resistor 179. As explained, this is inverted to a positive output pulse 193'' by inverter amplifier 192. The time period during which this occurs is indicated by the vertical dotted lines when the applicable binary waveforms have been redrawn to show this more clearly. This occurs between the 60th and the 64th flag pulse counts.

When this signal is combined with other gating pulses in signal 34'', it will cause the signal polarity (rf) to be reversed during this time interval. If the narrow flag pulse intervals were one for every three vertical fields, this would mean that the signal polarity would be reversed for each $3 \times 4 = 12$ vertical field intervals.

As a second example of generating a coding pulse, consider NAND gate 175, with its inputs photon coupled to outputs 164, 166, 169 and 171. The only time interval during which all four gate inputs are positive, as again shown in the waveforms of FIG. 8, is between the 48th and 52nd flag pulse counts, during which time NAND gate 175 output goes to zero level. This is inverted by amplifier 192 to positive gate pulse 194'' for this interval of time. When this pulse is combined with the other gate pulses in signal 34'' this signifies that between the 48th and the 52nd flag pulse counts the polarity of the television signal will be inverted at the encoder, and at the same time it will be inverted back to normal at the decoders.

As a third example, referring to FIG. 8, the gate inputs to NAND gate 176 are simultaneously positive only between the 40th and 44th flag pulse intervals, and in like manner produce positive gate pulse 195'', which is added to the other gating pulses in output signal 34''. In addition to the other signal polarity reversals, the polarity is now also inverted between the 40th and the 44th flag pulse intervals.

As a fourth and final example, again with reference to FIG. 8, the gate inputs to NAND gate 178, which has only three inputs, are simultaneously positive between the second and fourth, the 10th and 12th, and 34th and 36th, and the 42nd and 44th flag pulse intervals. In the same manner as before several gate pulses are now produced, as shown in waveform 196''. These are added to the other gate pulses in output signal 34''. As can be seen from the combined output signal addition, the new pulse gnerated between the 42nd and the 44th flag pulse intervals is masked by the signal occurring in the third example between the 40th and the 44th flag pulse intervals, but the other four new pulses significantly enter the output signal.

Although the circuitry of the gate signal generators at the decoders is similar to that just set forth, additional connections are made, as shown in FIG. 5, to zero the counters when long flag pulse 140'' appears. The trailing negative-going slope of pulse 140'' is coupled into monostable multivibrator 156', triggering it into conduction for a short interval of time less than 1.0 microsecond, as controlled by resistor 158' and capacitor 159'. This produces a zero level at the output for this period of time. When applied to the re-set R*d* inputs of the binary counters, this is sufficient to reset the counters to zero count.

The purpose of the long flag pulse in re-setting the decoder counters to zero is to synchronize the counters in the decoder with those of the encoder, after the decoder has been turned on, or after changing television channels. Once synchronism has been established there is no further need for the long pulse at the decoder unless power is interrupted or the channel is again switched during the program.

Interference signals would have to be a frequency of exactly 1.0 mhz for a duration longer than 10 microseconds to cause a false long flag pulse, which is a rare possibility. However, if this did happen, the very next long flag pulse would properly re-synchronize the counter again. If interference is received from a 1.0 mhz source and appears as a short flag burst indication, this would advance the counters at the decoder by one count ahead of the encoder. Reception of the next long flag pulse would again re-synchronize the decoder counters.

Video polarity switcher 35' at the decoder location is similar to and functions in the same manner as described for unit 35 at the encoder. Suffice it to say now that when an inverted signal is received at the base of input amplifier 36', the correct gating pulse signal 34'' is being generated to energize switch amplifier transistors 44' and 45', so that the input signal is inverted back to the correct polarity. The composite signals will therefore appear at the base of output transistor 50' in the correct polarity at all times. Transistor 50' is an emitter-follower type amplifier used to couple the composite signal from a high impedance as represented by load resistor 48' to a very low impedance across potentiometer 250 of FIG. 7. The amplitude of the video signal is selected according to the position of the arm of this potentiometer to provide an acceptable level at the input 251' to the modulator.

The decoded video and synchronizing signal at conductor 251 is essentially the same as was impressed upon the coding means at the transmitter from television producing means 69 in FIG. 3. That is, a signal suitable for operating a usual television picture monitor as normally used at various places in a transmitting station. If apparatus of this type is to be employed for reproducing the television image, then no further devices are required at the receiving station location other than the monitor. This includes locations where the image is to be exhibited upon a large screen in a theatre or public place.

In order for the image to be reproduced by an ordinary television receiver, as 259 in FIG. 7, without modification thereof, the video-synchronizing signal must be remodulated onto a television channel that the television receiver will receive. This is typically an used channel in the area where the television receiver is located. If television channels 2 and 4 are in use for ordinary television in the area, then the decoded television may be modulated upon an rf carrier-wave corresponding to channel 3. The channel selector knob of the receiver is set to channel 3 when the decoded television programs are desired. As to paying for the same, the receiver owner buys the decoding card 173.

A crystal-controlled overtone type oscillator using a mos-fet transistor 267 is used. Because crystals for VHF television channels are fragile and expensive, a lower frequency crystal is supplied for the excitation and inductor-capacitor tank circuit 268 is tuned to the desired harmonic for producing the carrier frequency.

For example, a 12.25 mhz crystal 269 may be used with tank circuit 268 tuned to the fifth harmonic to produce the 61.25 mhz picture carrier for channel 3. Additional feedback is obtained for the overtone crystal by employing capacitive divider 270 and 271 as a tuned circuit bypass. Diode 272 provides self-excited bias, with a high resistance grid leak. The picture carrier-frequency is supplied at suitable amplitude and at low impedance over conductors 265 and 266 to two separate modulators 254 and 262. One modulator is for video signals and the other is for a 4.5 mhz frequency-modulated audio carrier that must be added back to make a complete sight-sound television signal for reception by the usual television receiver. Separate modulators minimize intermodulation difficulties and also provide turning elements at the output of each modulator to attenuate undesirable sidebands before final mixing.

The composite video signal over conductor 251 is coupled into gate no. 1 of the dual-gate mos-fet transistor modulator 254 by means of capacitor 271. The synchronizing polarity now always being positive is clamped to d.c. bias voltage −VG1 such that the positive tips of the synchronizing pulses cause d.c. restorer diode 252 to conduct and short gate no. 1 to the bias supply for that interval of time. This causes the video signal to always be more negative, and in turn reduces the amplitude of drain current in transistor 254 so that peak white signals allow very little drain current to flow and to be controlled by carrier-frequency voltage on gate no. 2. Very little rf energy is thus allowed to pass to appear across tuned circuit 255. At the positive synchronizing pulse peaks much more drain current is available for the carrier signal voltage on gate no. 2 to control, and a much higher signal voltage appears across tuned circuit 255. This gives the polarity of carrier strengths required for the United States television standards.

Tuned circuit 255 is broad-banded by the parallel resistor shown. It is tuned to provide maximum response for the upper sideband to conform to the original sesqui-sideband transmission of the USA standard.

The filter-separated 4.5 mhz frequency-modulated carrier on conductor 115 is connected to gate no. 1 of modulator 262 through capacitor 260 and resistor 261. This is an a.c. signal and to obtain effective modulation it is only necessary that the bias on gate no. 1 be adjusted so that the audio carrier provides a linear supply of drain current variation for the picture carrier voltage on gate no. 2 to control. Tuned circuit 263 is tuned to favor the upper sideband, or audio carrier frequency, and to attenuate the lower sideband, to minimize interference to adjacent channels and certain beat frequencies.

The video-modulated carrier is supplied by a low impedance pickup coil in 255 to a balanced output coil mixing arrangement. So also the sound-modulated carrier is supplied by a low impedance coil 263 to the balanced output mixing coil. The two carrier input coils 256 are wound in such a manner that the signal current flowing in either does not induce a voltage back into the other. The single coil 261 feed to the antenna switch associated with the television receiver is coupled to pick up rf energy from both input coils.

Four-pole double-throw antenna switch 257 is provided so that the television receiver can be connected directly to television antenna 258 when thrown to the right, or connected to the output of the decoder at the same time the antenna is connected to input coil 100 of the decoder when thrown to the left.

The signal voltage of the picture carrier can be adjusted by control 250. The signal voltage of the audio carrier can be adjusted by control 114. It is normally adjusted for a 4:1 reduction in signal power, which is half the voltage of the picture carrier.

Herein certain terms may be further defined.

A carrier-wave is to include the simple term "carrier" as well. A first modulation component is a broad term for a narrow flag burst or pulse corresponding. A second modulation component is a broad term for a wide flag burst or pulse corresponding. The term narrow may also be considered "short" and wide may be considered "long".

First circuit-code-determining-means may be the known punched card of the computer field, or an electrically conductive or magnetic card equivalent.

Selected characteristics are those associated with such cards, such as holes, electrically conductive segments, segments of magnetically permeable material, or poles of permanent magnetism.

Normally, the circuit-code-determining-means 173 and those employed at the several authorized receivers are identical, as identically punched cards. However, since the determination of circuit performance can be identical with any of the cards mentioned there is no restriction upon the type as long as the circuit performance determined thereby is the same as another type also employed. The term card is subject to wide interpretation, such as including a strip.

I claim:

1. The method of scrambling television which includes the steps of:

a. forming a signal (34'', FIG. 8) having time intervals of selectable programmed random periodicity that embrace plural field cycles of television scanning, by sequential counting, as affected by a first circuit-code-determining means (173), b. transmitting a carrier-wave modulated with television receiver-useable both video and synchronizing information for time intervals of said signal, c. transmitting said carrier-wave modulated with television receiver-unuseable both video and synchronizing information during alternate time intervals of said signal, d. forming a first modulation component(126'') a plurality of times during said intervals of said signal and related to said sequential counting to maintain said selectable programmed random periodicity between said signal and said cycles of television scanning, said first modulation component being unrelated in time to the useable and unuseable intervals of said signal, e. forming a second modulation component(126') having a characteristic distinguishing it from said first modulation component (126''), said second modulation component ocurring at the beginning of each sequence of said sequential counting, and being unrelated in time to the useable and unuseable intervals of said signal, and f. transmitting said carrier-wave also modulated with said first and second modulation components.

2. The method of claim 1 in which said signal of fixed selected format is formed by the steps of;

a. counting pulses (226') time related to plural field cycles of television scanning, b. passing predetermined counted pulses (as 165'', 167'', 169''& 171) to a logic network, and c. forming pulses having random duration and random spacing (34'') from the passed pulses according to predetermined logic of said logic network.

3. The method of claim 1, which additionally includes;

a. receiving said carrier-wave, b. demodulating said carrier-wave, c. providing the same said signal (34) of fixed selected format by counting said first modulation component (126), and d. converting the sequences of said receiver-unuseable video and synchronizing information to be receiver-useable during said alternate intervals of said period of said signal of fixed selected format, whereby receiver-useability is obtained for all of said video and synchronizing information.

4. Apparatus for scrambling television, comprising;

a. coding means (31, 32, 33) to form a signal of fixed selected format (34'') having a selectable programmed random periodicity with respect to television scanning, and first and second modulation component pulses (226', 227'), said signal having a selected periodicity sufficiently long to include plural field scanning cycles in each period, b. a double differential-amplifier switcher (35) connected means-for-continuously-producing (69) normal video and synchronizing information, c. gating means (33) of said coding means connected to said switcher, and having series-connected multiple counting means (150–155), first circuit-code-determining means (173), and logic elements (174, 175,), operatively connected to said counting means and effectively sequentially operable to produce random intervals (2, 3) of abnormal said video and synchronizing information according to multiples of said fixed selected format which are unuseable at a television receiver, alternately with respect to intervals of normal (8, 9) said video and synchronizing information, d. burst means (53) connected to said coding means for producing first and second modulation component bursts related to said television scanning, and randomly related in time to the beginning of means said period of said intervals of abnormal said video and synchronizing information, respectively, according to said first circuit-code-determining means (173), e. a burst-adder (65) connected to said switcher (35) and said burst means (53) to add said first and second modulation component bursts to said video and synchronizing information for operating counting means at a receiver, f. televesion transmitting means (91, 92) having a modulator (78), and g. a connection (67) between said coding means, said switcher, and said modulator, whereby successive intervals of useable and unuseable said video and synchronizing information, and said first and second modulation components are modulated upon one carrier-wave.

5. The apparatus of claim 4, in which the logic elements of said gating means (33) include;

a. a large plurality of means responsive to the selected characteristic (160–171) of said first circuit-code determining-means (173) which determines the circuit code, and b. predetermined electrical connections (183–191) between said logic elements, whereby the time of occurrence and duration of each said interval of abnormal said video and synchronizing information is determined by both the selected characteristic of the first circuit-code determining-means and the electrical connections between said logic elements.

6. The apparatus of claim 4, in which;

a. said normal video and synchronizing information has a given polarity, and said abnormal video and synchronizing information has the opposite polarity to said given polarity.

7. The apparatus of claim 4, which additionally includes;

a. receiver means (103–110) to receive and demodulate (106) said carrier-wave, b. a decoder (109, 135, 140, 250, 256) connected to said receiver means, c. gating means (33') included in said decoder, and having second circuit-code-determing means (173') equivalent to said first circuit-code-determining means, d. a connection from said receiver means to said gating means to control said gating means in accordance with said modulation components, and e. a second double differential-amplifier switcher (35) connected to said gating means, whereby said intervals of unuseable said video and synchronizing information are rendered useable.

8. The apparatus of claim 7, in which said decoder includes;

a. a nand gate (136, 137), b. first amplifying means (131) connected to said nand gate to provide a pulse (132'') having the duration of said first modulation component, and c. second amplifying means (125) connected to said nand gate to provide pulses (128'') having the durations of both said first and second modulation components, whereby an output pulse (140'') from said nand gate occurs only each time a pulse having the duration of said second modulation component occurs.

9. The apparatus of claim 4, in which said coding (31, 32) and gating means (33) thereof comprise;

a. a plurality of connected counters (150–155), b. plural illuminating means (172) plurally connected to said counters, c. said first circuit-code-determining means embodied as an opaque member (173) having preselected holes (163–169, etc.) aligned with selected said illuminating means, d. plural illumination-sensitive means (183–189,etc.) aligned with said plural illuminating means, and e. plural logic means (174–178) uniquely connected to said plural illumination-sensitive means to sequentially produce an electrical output according to the illumination through said preselected holes.

10. The apparatus of claim 4, in which said switcher (35) comprises;

a. a first differential amplifier (36, 37), b. a second differential amplifier (44, 46) connected to one output of said first differential amplifier, c. a third differential amplifier (45, 47) connected to the other output of said first differential amplifier, d. an output circuit (48), e. a connection from said gating means (33) to said second and third differential amplifiers, whereby a video and a synchronizing signal input to said switcher is reversed in polarity at said output circuit upon the presence of an output from said gating means.

11. The apparatus of claim 4, which additionally includes;

a. amplitude shiftable clamping means (80–83) to establish a black level at said modulator (78) connected thereto, and b. bias means (79), connected to said clamping means, to shift the amplitude of said black level according to the polarity of the video and synchronizing information existing at said modulator.

* * * * *